United States Patent
Montminy

(10) Patent No.: US 8,422,561 B2
(45) Date of Patent: Apr. 16, 2013

(54) METHOD AND SYSTEM FOR LOW-SUBBAND CONTENT DISCRIMINATION

(75) Inventor: Christian Joseph Eric Montminy, Ottawa (CA)

(73) Assignee: March Networks Corporation, Ottawa, Ontario (CA)

( * ) Notice: Subject to any disclaimer, the term of this patent is extended or adjusted under 35 U.S.C. 154(b) by 2006 days.

(21) Appl. No.: 11/350,040

(22) Filed: Feb. 9, 2006

(65) Prior Publication Data

US 2006/0177141 A1 Aug. 10, 2006

Related U.S. Application Data

(60) Provisional application No. 60/651,067, filed on Feb. 9, 2005.

(51) Int. Cl.
*H04N 11/02* (2006.01)
*H04N 7/14* (2006.01)

(52) U.S. Cl.
USPC .............. 375/240.2; 375/240.22; 375/240.23; 375/240.25; 375/295; 375/316; 348/14.13; 348/14.15

(58) Field of Classification Search .................. 375/219, 375/222, 240.01–240.03, 240.18, 240.2, 375/240.22–240.28, 295, 316; 348/14.13, 348/14.14, 14.15, 220.1, 222.1
See application file for complete search history.

(56) References Cited

U.S. PATENT DOCUMENTS

| | | | |
|---|---|---|---|
| 5,589,829 A | 12/1996 | Astle | |
| 5,666,461 A * | 9/1997 | Igarashi et al. | 386/329 |
| 6,006,276 A | 12/1999 | MacCormack et al. | |
| 2003/0053543 A1* | 3/2003 | Bhaumik et al. | 375/240.16 |
| 2003/0235248 A1* | 12/2003 | Kim et al. | 375/240.12 |

FOREIGN PATENT DOCUMENTS

| CA | 2 326 674 | 11/1999 |
|---|---|---|
| EP | 0 777 388 | 6/1997 |

* cited by examiner

*Primary Examiner* — Sam K Ahn
*Assistant Examiner* — Linda Wong
(74) *Attorney, Agent, or Firm* — Curtis B. Behmann; Borden Ladner Gervais LLP

(57) ABSTRACT

A method and system are provided for discriminating areas of content from areas of noise in difference images of a digital video sequence. This allows the fewest bits possible to be used to encode areas of noise according to a video compression algorithm. The method comprises computing a difference frame from current image data and a reference frame; comparing at least one component of a candidate block within the difference frame to a threshold value to discriminate between content and noise; and encoding the candidate block if content is detected.

20 Claims, 4 Drawing Sheets

METHOD AND SYSTEM FOR LOW-SUBBAND CONTENT DISCRIMINATION

CROSS-REFERENCE TO RELATED APPLICATIONS

This application claims the benefit of priority of U.S. Provisional Patent Application Ser. No. 60/651,067, filed Feb. 9, 2005, which is incorporated herein by reference in its entirety.

FIELD OF THE INVENTION

The present invention relates generally to digital video. More particularly, the present invention relates to digital video content discrimination and/or encoding and compression.

BACKGROUND OF THE INVENTION

Digital video recording is quickly overtaking analog video recording in terms of popularity, in both consumer and corporate applications. Digital video recording can be used in corporate settings for surveillance, often providing 24-hour-a-day coverage, with a requirement to store a certain number of days of video footage. While analog video recording typically uses tape as the recording medium, digital video recording typically uses a hard drive or other computer-readable medium. If a network of digital video recorders is used, the issues of both storage resource consumption and bandwidth consumption for the transfer of the digital video recording need to be considered. As such, compression of multimedia data is an important issue, since it allows the system to employ less transmission bandwidth and/or hard disk space for the recordings.

The compression techniques used in the encoding of digital recordings can be classified as either lossy or lossless. Lossless techniques preserve data integrity, and are used in a situation where it is necessary to have an exact replica of the initially transmitted data after decompression. One such technique is the well-known Lepel-Ziv-Welsh (LZW) lossless compression algorithm which is considered to be effective due to its ability to remove redundant data. In lossy compression techniques, the goal is not 100% replication of the original data, but rather to convey the essence of the information contained in the original signal prior to compression. Lossy techniques are typically used for audio and visual (both still and motion video) data, neither of which typically have sufficient redundancy to allow for good compression ratios when lossless compression is employed. Lossy techniques allow the discarding of information determined to not be relevant to a viewer's (or listener's) perception of the data.

Commonly used lossy compression techniques include H.263, H.264, MPEG 4, and Motion JPEG for digital video, as well as JPEG compression for still pictures/images. Many of the video compression techniques encode only the changes between adjacent frames. Due to noise in the captured digital video image, large portions of a frame in a video sequence may be encoded due to the change in the image despite an observer regarding the frame as not holding any real information or content. Such noise can be due to factors such as lighting variations, sensor noise, etc. With traditional video compression algorithms, the areas encoded due to the presence of noise consume bits in the encoded bitstream as the algorithm tries to reproduce this noise in the encoded video sequence.

The percentage, or proportion, of the total bits used to encode non-content areas in a digital video sequence can depend on the following factors: 1) Quality of the encoded video: the higher the quality of the reproduced video, the more visible subtle changes in these areas of non-content become, this results in more bits being used to represent the frame; 2) Noise present in the scene/camera: lighting quality and/or camera quality can affect how much noise is produced, more bits are required to encode non-content areas in a given scene; and 3) Activity in the scene: the less activity or movement in the scene, the more dominant the areas of non-content in the image will become, fewer bits will be used for encoding content which makes the percentage of bits for non-content areas more significant.

A typical digital video system is illustrated in FIG. 1. From a given video source 10, video can be compressed in a video encoder 12 either directly (intra-frame) or differentially relative to the previously encoded video frame (inter-frame). In digital video compression, a key frame is a frame in which all of the information is recorded for every component of the frame. Interframes are frames in which only the difference from a chosen reference frame is transmitted or recorded. Interframes can be alternatively referred to as difference frames.

A typical video encoder 10 comprises the following processing blocks and functions. a) Used for inter-frame, motion estimation block 14 finds the best motion-compensated reference frame 26 to subtract from input frame. b) Transform block 16 converts the pixel values of the difference frame into frequency domain. Most methods use the discrete cosine transform (DCT), but other transforms can alternatively be used. c) Lossy compression occurs in quantizer block 18, typically by integer dividing the transform coefficients by a given quantizer step size. d) Entropy coding block 20 performs lossless compression of encoding symbols in as few bits as possible. Typical methods here are Huffman coding and arithmetic coding. e) Inverse quantizer block 22 reconstructs the coefficients by quantization weights. f) Inverse transform block 24 reconstructs pixel values that are then used to update the reference image or reference frame 26.

A compressed bitstream 28, containing the encoded video, is output by entropy coding block 20 and transmitted to video decoder 30, which decodes the received bitstream to facilitate viewing of the encoded video. Optional intermediate steps can include storing the video in a storage device 32 and/or sending it over a network. The decoder 30 performs the inverse procedure of the encoder as shown by the blocks labelled 14$i$, 16$i$, 18$i$, 20$i$, and 26$i$ in order to reconstruct a frame that can then be viewed.

As specified earlier, a problem with this typical video system is that areas where the only changes to the frame are attributable to noise consume excessive space. This is due to the fact that any region whose DCT coefficients are quantized to non-zero values will be encoded into the bitstream and thus consume bandwidth and require additional storage resources. Existing methods to remedy this problem usually attempt to suppress the noise across all regions in the frame equally. Such methods include spatial and/or temporal filters applied to the video frames prior to encoding to suppress the changes observed in the image due to noise. These methods are generally expensive in CPU usage and/or memory and generally have detrimental impact on video quality. Spatial filtering of a video frame typically reduces the resolution of the image in areas of content as well as non-content, negatively impacting the quality. Temporal filtering of a video frame sequence typically adds ghosting artifacts in areas of legitimate changes in the video sequence. Some methods exist to try to limit the artifacts of such methods, but these can be relatively complex.

When considering digital video compression, the ability to distinguish between changes in frames due to relevant content and the presence of noise is of significant benefit. For instance, if a security guard were to watch a video of a person walking down a hallway, the details relating to the physical features of the person would be much more important to the security guard than an exact representation of a particular shade of paint on the static walls in the hallway. When observing changing frames in a digital video sequence, the information that is not changing over time is generally not important to the eye.

It is also known to determine if a particular pixel block of an image has changed. U.S. Pat. No. 6,006,276 to MacCormack et al., the contents of which are incorporated herein by reference in their entirety, describes such an approach. MacCormack generates compressed image data for blocks in which a change in the DC component of the block is detected. Such an approach requires a comparison between the coefficient data from the current image and the corresponding coefficient data from a related reference image. Also, reference image data must be stored to make the comparison. MacCormack also suggests comparing the content of neighbouring blocks, but limits such comparison to blocks within the same coding unit.

It is, therefore, desirable to provide better compression based on content discrimination, in order to reduce disk storage space for storage of digital video, or to reduce bandwidth requirements for transmission of digital video, while retaining picture quality in regions of content.

SUMMARY OF THE INVENTION

It is an object of the present invention to obviate or mitigate at least one disadvantage of previous digital video compression approaches.

In a first aspect of the present invention, there is provided a method of compressing digital video data. The method comprises computing a difference frame from current image data and a reference frame; comparing at least one component of a candidate block within the difference frame to a threshold value to discriminate between content and noise; and encoding the candidate block if content is detected.

According to various embodiments, the threshold value can be a predetermined static threshold value and the step of comparing the at least one component of the candidate block to the threshold value can comprise comparing a DC component of the candidate block to the threshold value. The method can comprise applying a discrete cosine transform (DCT) to the difference frame to obtain the DC component and AC components of the candidate block. The step of comparing the at least one component of the candidate block to the threshold value can further comprise comparing at least one AC component of the candidate block to a second threshold value, which can include comparing a value derived from the at least one AC component, such as a representation of an energy component, to the second threshold value. The method can further include the steps of comparing at least one component of neighbouring blocks within the difference frame to discriminate between content and noise in the neighbouring blocks; and encoding the candidate block if content is detected in any neighbouring block. The encoding of the candidate block may be done according to one of the H.263, H.264, JPEG, and MPEG standards.

In a second aspect of the present invention, there is provided a content discriminator for a digital video encoder. The content discriminator comprises a comparator and a content detector. The comparator compares at least one component of a candidate block within a difference frame to a predetermined threshold value. The content detector discriminates between content and noise based on a result output by the comparator.

According to embodiments of the second aspect, the predetermined threshold value may be static, and the at least one component may be a DC component of the candidate block obtained as a coefficient of a discrete cosine transform. In an alternate embodiment, the at least one component is at least one AC component of the candidate block. The comparator can operate to compare at least one component of neighbouring blocks within the difference frame to the predetermined threshold, and the content detector operates to discriminate between content and noise in the neighbouring blocks.

In a third aspect of the present invention, there is provided a video data compressor. The video data compressor comprises a transform processor, a content discriminator and an encoder. The transform processor applies a transform to a candidate block of a difference frame of a digital video sequence. The content discriminator discriminates between noise and content within the candidate block by comparing at least one component of the transformed candidate block to a predetermined threshold value. The encoder encodes the candidate block if the content discriminator determines content is present in the candidate block.

In embodiments of the third aspect of, the threshold value can be a predetermined static threshold value, the at least one component can be an AC or DC component and the transform can be a DCT transform. In other embodiments, the content discriminator compares at least one component of transformed neighbouring blocks within the difference frame to discriminate between content and noise in the neighbouring blocks; and the encoder encodes the candidate block if content is detected in any neighbouring block.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for discriminating areas of content from areas of non-content in difference images of a digital video sequence. When applied to a difference frame, this allows areas where relevant content has changed to be encoded, while allowing areas where the only change in content is attributable to the presence of noise to be passed over in the encoding process. This discrimination allows a reduction in the number of bits to be encoded by a video compression algorithm. Changes in the areas of non-relevant content are typically attributable to noise, and these areas in a frame are referred to herein as "noise". According to embodiments of the present invention, data can be observed at a transform unit, such as a discrete cosine transform (DCT) unit. A discrimination decision is made, at this level, as to whether the observed data is information (relevant content) or noise. If the data is determined to be noise, it is not quantized and is simply zeroed out, thereby reducing storage space and/or transmission bandwidth.

Figures 4, 5:
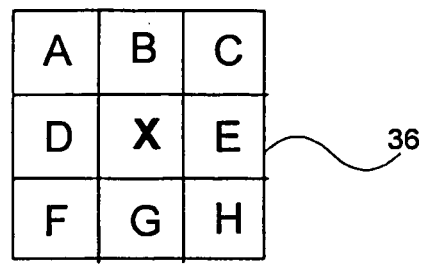
FIG. 4 illustrates a region having a block X and eight neighbouring blocks.
FIG. 5 illustrates a DCT coefficient matrix.

A method includes determining whether a region of a digital video sequence includes content, the region including a candidate block and a plurality of neighbouring blocks. An exemplary region 36, within a video sequence frame 38, is depicted in FIG. 4. The region 36 includes a candidate pixel block X surrounded by neighbouring pixel blocks A, B, C, D, E, F, G, and H. The candidate block X is encoded if it is determined to have content, or if one of its neighbouring blocks is determined to have content.

Embodiments of the present invention can be described as providing a low-sub-band content discrimination method and apparatus, used to apply temporal noise filtering to a digital video sequence.

As used herein, the expressions "DC coefficient" and "DC component" are used interchangeably to refer to an element in the discrete cosine transform (DCT) coefficient of a signal representing a portion of the captured frame for which the frequency is zero in all dimensions. A DCT coefficient is the amplitude of a specific cosine basis function. The DC coefficient or component can alternatively be described as a coefficient that scales the constant basis function (u=0). In the described embodiments, a two-dimensional DCT process is applied to each pixel block, in accordance with conventional practice, such as for JPEG or MPEG encoding. This results in an eight-by-eight DCT coefficient matrix, as shown in FIG. 5. The DC component is conventionally represented as the upper left entry in the two-dimensional DCT coefficient matrix (i.e. the first element (0,0) in the DCT coefficient matrix), as shown in FIG. 5. The DC coefficient, or component, gives the average over a set of samples within the pixel block. The remaining entries in the DCT matrix are referred to herein as AC components of the pixel block, and correspond to the spatial frequency components of the pixel block data, with higher frequency components progressively arrayed to the right and downward.

Embodiments of the present invention take advantage of the fact that information that is not changing over time is not important to the eye and thus need not be encoded in difference frames. Therefore, distinctions are made in order to use most of the transmission bandwidth, or hard drive storage space, on the "interesting" information (also referred to as content) rather than on the unchanging information (referred to as noise). This can be particularly useful with respect to low light recordings, which typically contain a high proportion of noise.

Embodiments of the present invention take advantage of the property that noise contains random temporal changes, and as such a difference image is likely to have little if any low-frequency content (sensor noise can be modeled as zero-mean Gaussian noise). For real content, this is not the case; the low frequency components, represented by the DC component, typically contain higher values to describe content change. Thus, if the DC component of a particular pixel block in the inter-frame difference image exceeds a predetermined threshold value, the pixel block can be considered to include content rather than noise. In many implementations the predetermined threshold is implemented as a static threshold, or as a threshold selected from a static list.

An exception to this case occurs when a region contains only a few pixels of an object that may not contribute sufficiently to cause the DC component threshold to be exceeded. A comparison with neighbours, as will be discussed later, deals with such cases and should ensure that these regions are encoded along with regions that contain more pixels of the object.

A second exception occurs when a moving object is small, vertically and/or horizontally, as compared to region size. This can produce a difference region that contains components of where the object was previously and is currently. Such a difference can cancel out the DC content in this region. An analysis of the remaining coefficients, as will be discussed later, deals with such cases and should ensure that these are encoded.

Discrimination between noise and content regions can have additional benefits in suppressing the noise from low quality input signals. This can be useful in many applications including in production of the surveillance cameras. Techniques for content discrimination can be used independently of particular compression technologies. The particular compression technology used with embodiments of the present invention preferably includes a transform processor, such as a discrete cosine transform (DCT) processor.

Known approaches take every piece of information in a digital video signal, quantize it, and send the quantized information. According to embodiments of the present invention, data or information is observed at a transform unit or means, such as a discrete cosine transform (DCT) processor. A decision is made by a content discriminator as to whether observed data is content or noise based upon the comparison of a component, such as the DC coefficient, of a candidate block in the difference frame to a threshold. If the information is determined to be noise, the data is not quantized and thus is not included in the encoded difference frame which reduces the necessary storage/transmission space and/or bandwidth.

Analysis of video data is described below as being performed in the frequency domain, but analysis in other domains is contemplated. Components of a digital signal are transformed into the frequency domain to allow for simpler analysis than would be possible if individual pixels of the digital video frames were analyzed. A mathematical transform, such as a discrete cosine transform, is typically used to convert the pixels into a spectral or frequency domain, which facilitates finding repetition in frequencies, or textures. Other transforms, such as fast-Fourier-transforms discrete-fast-Fourier transforms and z-transforms can also be used. The transform processor is used to separate true content from noise in a digital video signal. DCT processors are discussed below because a functional equivalent to a DCT is found in compression technologies such as the H.263, H.264, MPEG, and JPEG compression standards, thus the existing DCT processor in the encoding system can be reused.

Selection of the portions of frames to encode allows for a reduction in the bandwidth requirements by not encoding information deemed to be noise from the outset. A content discriminator at the encoder side allows differentiation between regions of content and noise, which then serves as the basis to determine whether a particular portion of a frame will be encoded. The content discriminator typically includes a comparator and a content detector, which function as described above. Encoders employing the content discriminator can produce output data compliant with standard compression routines, and thus do not require modification of the decoder hardware.

The selection of which signals to encode and which signals not to encode can be performed using a spatio-temporal filter.

Temporal differences that have a relatively small average within a given spatial region are discarded, while more significant temporal differences are retained, maintaining the full, or substantially full, visual resolution of the picture.

Figure 2:
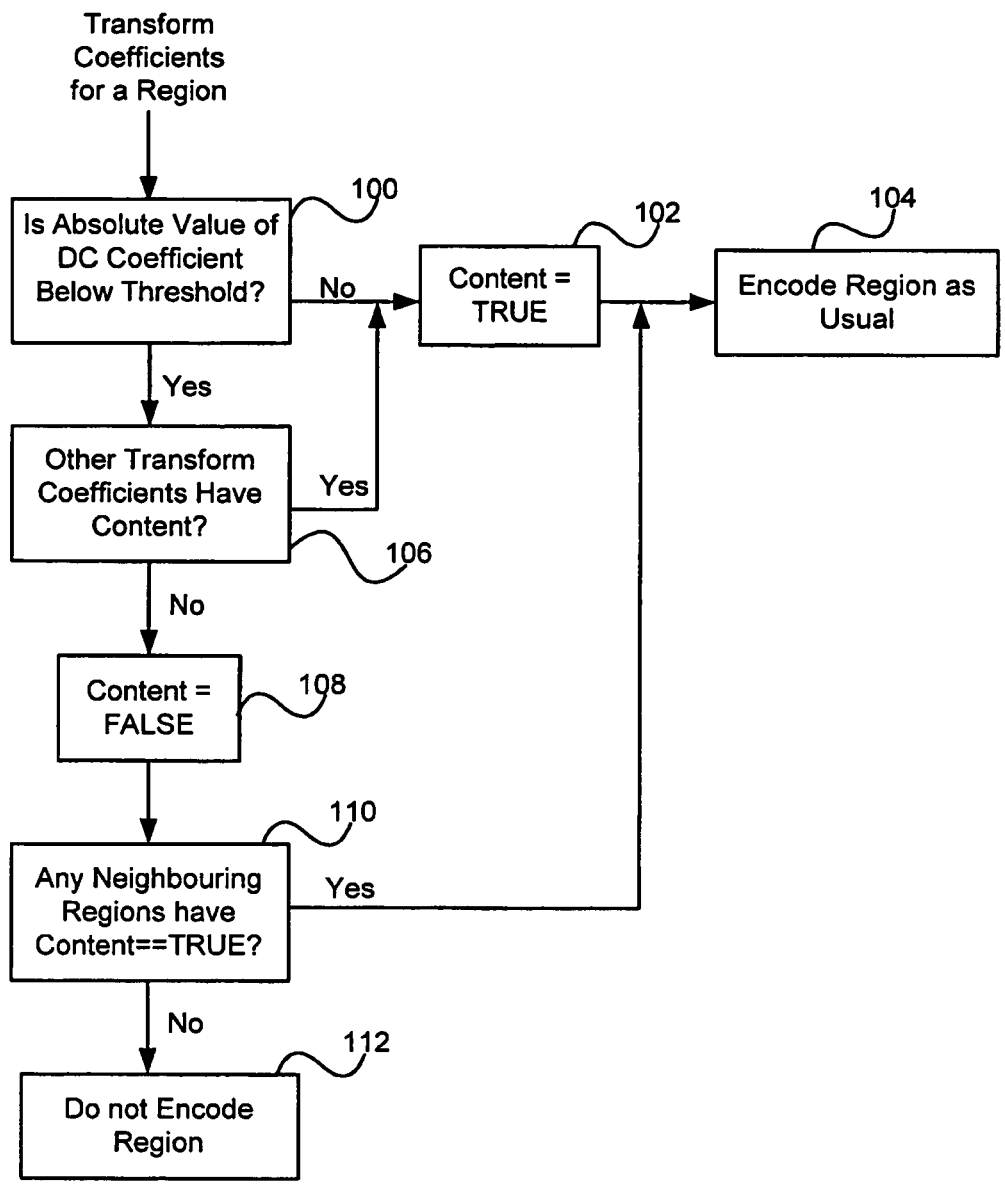
FIG. 2 is a flow diagram of a method according to an embodiment of the present invention.

A method according to an embodiment of the present invention that operates on the transform coefficients of a region is illustrated in the flow diagram in FIG. 2. The method includes the step (100) of comparing an absolute value of a DC coefficient of a candidate block to a predetermined threshold value, such as a frequency threshold. In some embodiments, this predetermined threshold is a static threshold. If the absolute value of the DC coefficient is above the threshold (102), the candidate block is encoded (104) as usual. If no content is detected (as denoted by a DC coefficient value below the threshold), the block is either not encoded, or is subjected to additional processing steps, such as a neighbourhood search, or an AC component comparison, as described below.

As described previously, for moving objects that are small in at least one dimension, it is possible that the DC coefficient will be below the threshold despite the presence of valid content. To remedy this, an optional step includes analyzing the remaining transform coefficients (e.g. the AC components). This allows the discriminator to differentiate between content and noise when the DC component is below the threshold (106). The non-DC coefficients are analyzed to allow further identification of content in the candidate block. This identification of content can, for example, be achieved by examining the energy (e.g. the sum of squared coefficient values) in different pertinent regions of the two-dimensional coefficient matrix as shown in FIG. 5. FIG. 5 illustrates nine defined AC regions, indicated by their respective letters A-I, in an eight-by-eight coefficient matrix according to an embodiment of the present invention. An AC threshold algorithm divides the matrix into nine specific AC regions. As shown in FIG. 5, each AC region contains seven coefficients. The AC region's energy is the sum-of-squares of the seven components. In addition to looking at energy in horizontal (A), vertical (B), and diagonal (C) regions, we also look at secondary vertical (D), secondary horizontal (E), and secondary diagonal (F, G, H, I) regions. Because the first three regions (A, B, and C) are most likely to exceed the AC threshold, they are the first to be analyzed and the encoder will perform an early exit once a region's energy is found to exceed the threshold. In a current implementation, an AC threshold of 3600 was found not to trigger on most noise, but to trigger on most content.

If the energy in any such AC region is above a predetermined threshold, not necessarily related to the predetermined threshold applied to the DC analysis, it is determined that the region has content (102) and it is encoded as usual (104). Otherwise, the region is determined to have no content (108) and not encoded. Other embodiments can employ different means for discriminating content in non-DC coefficients, such as: comparing the energy of all coefficients to a threshold; comparing the maximum absolute value of all or a subset of coefficients to a threshold; comparing the percentage of energy in a given region to a threshold.

As mentioned earlier, a region may contain only a few pixels of an object and which will not contribute sufficiently to cause the DC component threshold to be exceeded. To remedy this, embodiments of the present invention can also include a neighbourhood search (110). This neighbourhood search can include an investigation of the blocks surrounding a candidate block (i.e. blocks A-H surrounding block X in FIG. 4). For instance, if a block neighbouring the candidate block has been identified as having content, the candidate block will also be encoded (104), otherwise it is not encoded (112).

In other words, the neighbourhood search includes determining whether a portion of a region of the digital video sequence includes content, the region including a candidate block and a plurality of neighbouring blocks. The method also includes encoding the candidate block in response to a determination that that the candidate block has content, or that one of the plurality of neighbouring blocks has content. Another way of describing the process is that if a candidate block is determined to have content, its neighbouring blocks are included as blocks that must be encoded, whether or not they have content.

In an embodiment, a candidate block is encoded if the candidate block is deemed to have content or if any of its neighbouring blocks are deemed to have content. A block is considered to have content if its DC value is above a threshold; or the energy of any of nine AC regions (each AC region contains seven AC coefficients) is above a threshold.

While some known approaches perform a direct comparison between current and reference DC coefficients in neighbouring blocks in the same encoding unit, embodiments of the present invention consider as well neighbouring blocks from neighbouring encoding units, and discriminate based on a threshold value. Also, while some known approaches use AC coefficients to supplement the decision, the present invention preferably does not look at individual AC coefficients, but the RMS energy (or other such energy measure) of groups of these AC coefficients.

Embodiments of the present invention preferably consider an N×N region equal in size to the region of the chosen compression method. These are typically eight-by-eight regions (such as for H.263 and MPEG 4), but are not necessarily this size. In a presently preferred embodiment, verification of the neighbouring regions includes comparison of eight neighbouring blocks to the threshold. If any of the neighbouring blocks are determined to include content, the candidate block is encoded.

In an exemplary embodiment, using an H.263 encoder, a candidate block is processed to provide an eight-by-eight DCT coefficient matrix. A threshold of 30 is used to discriminate the absolute value of the DC coefficient. To determine content in the remaining coefficients, the following three regions are considered: Horizontal (7 coefficients (1,0), (2,0) to (8,0)); Vertical (7 coefficients (0, 1), (0, 2) to (0, 8)); and Diagonal (7 coefficients (1, 1), (2, 2) to (8, 8)). If any of these three regions has an energy value greater than 3600, the candidate block is then deemed to have content even if its absolute DC value is below 30. For the neighbourhood search, the eight-by-eight DCT coefficient matrices of the neighbouring blocks are verified. H.263 operates on a macro-block (MB) unit that consists of four luminance eight-by-eight blocks and two chrominance eight-by-eight blocks. The neighbourhood search can operate independently on both luminance and chrominance blocks. A further limitation is that if any of the luminance blocks are encoded, the chrominance blocks of the MB will also preferably be encoded to ensure that the blocks get their proper color. This exemplary algorithm operates on all H.263 inter-frames, while key frames are encoded as usual.

Embodiments of the present invention can be used with any suitable compression protocol or compression technology. Embodiments of the present invention, when applied properly, will not generate any more artefacts than would be already generated by a standard encoding operation. A content discrimination method, or algorithm, according to an embodiment of the present invention, is implemented independently of the particular compression technology. This provides for flexibility in changing the compression technology when better technologies are adopted, while retaining the advantages according to embodiments of the present invention.

Figure 1:
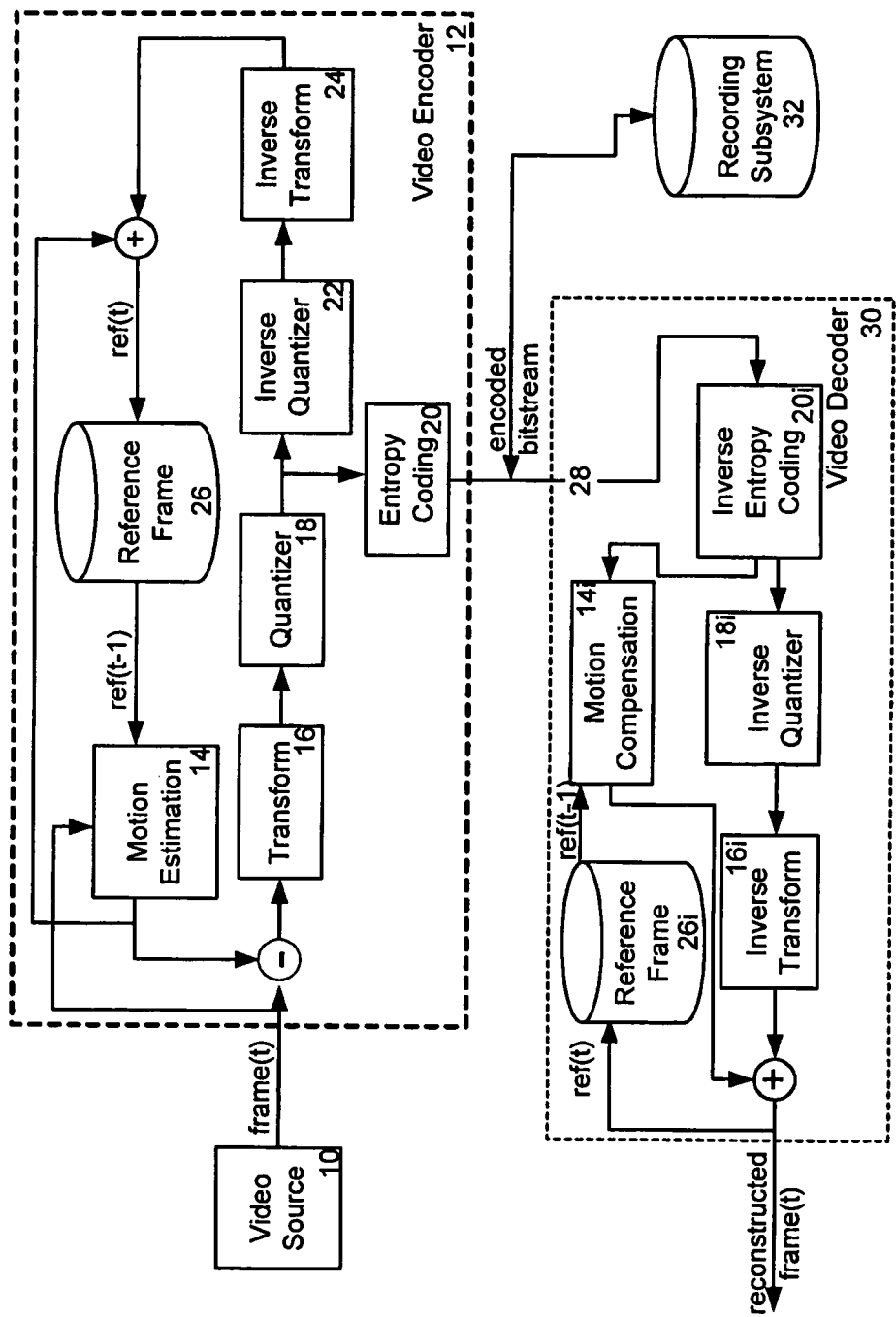
FIG. 1 is a block diagram of a known video system without content discrimination.
Figure 3:
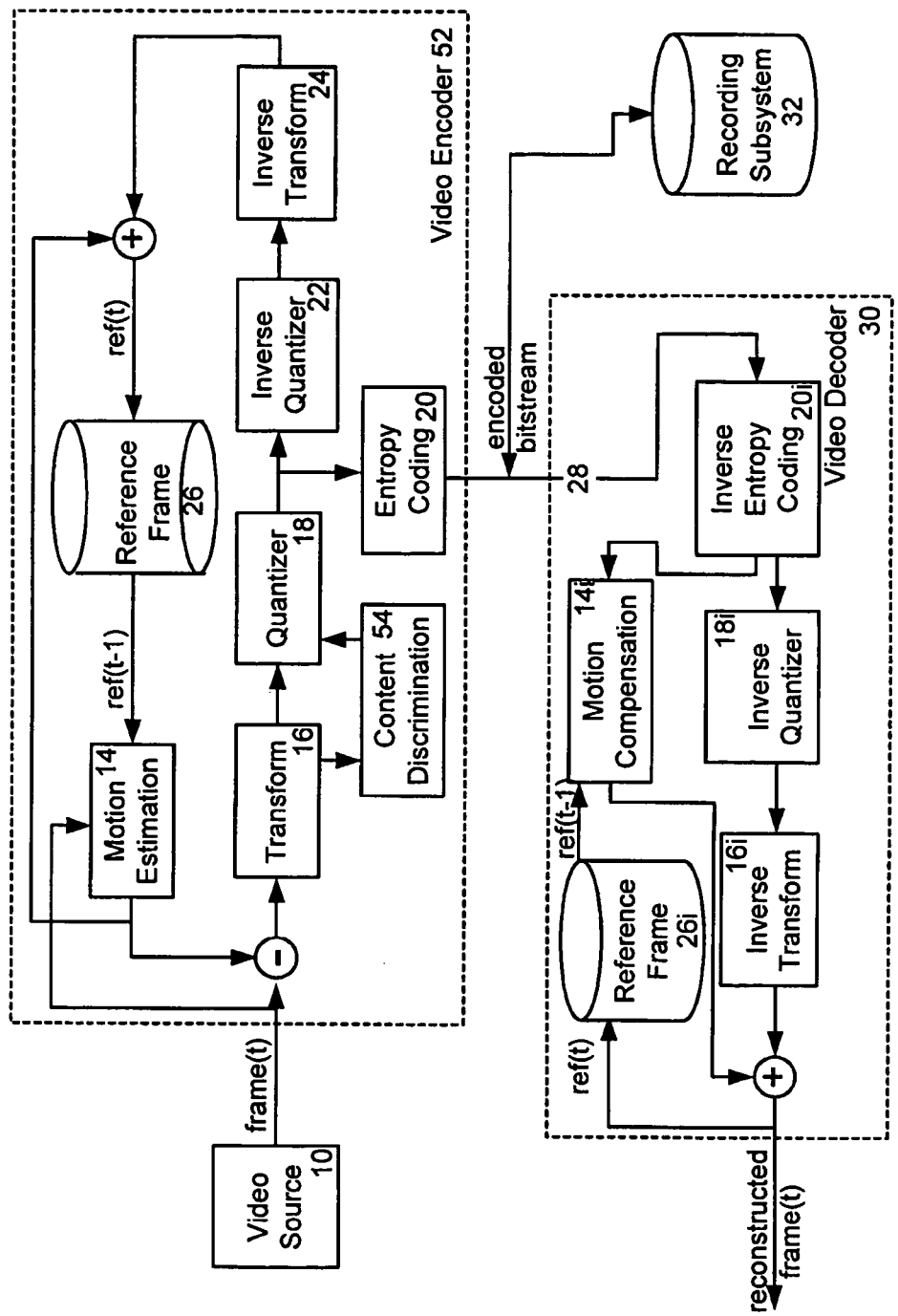
FIG. 3 is a block diagram of a video system with content discrimination according to an embodiment of the present invention.

Embodiments of the present invention can be implemented in a system, such as the system illustrated in FIG. 3. Functional blocks previously described in relation to FIG. 1 are similarly numbered. Content discrimination according to the present invention can be implemented inside a video encoder or compressor 52. The encoder 52 can identify noise components, and does not encode the frame differences produced by such noise. A content discrimination block 54, or content discriminator, operates on the transformed coefficients of a difference frame and informs the quantizer 18 which region of the image can be completely quantized out. Typically, this operation is performed on inter-frames, not on intra frames. Though an entire video encoding/decoding system is shown in FIG. 3, it is to be understood that embodiments of the present invention are provided in the encoder, or components that are in data communication with the encoder.

The content discriminator includes a content detector to determine whether a region of the digital video sequence includes content based on the output of a comparator that compares characteristics of the region to threshold values. The region typically includes a candidate block and a plurality of neighbouring blocks. The content discriminator can provide instruction to the encoder to encode the candidate block in response to a determination that that the candidate block has content, or that one of the plurality of neighbouring blocks has content. In an alternate embodiment, the discriminator zeroes out the noise related regions leaving only content, and provides the modified frame to the encoder. This reduces both encoder processing time as well as storage and transmission resource needs.

Most known technologies employ noise filtering and content discrimination methods outside of an encoder, which requires additional computational resources to perform these algorithms. This results in increased costs and/or increased power consumption. Embodiments of the present invention make better use of existing data and components. The transform processor, such as the DCT unit, is already provided in most systems for use in the compression encoding. Embodiments of the present invention apply the transform to the data block and analyse the frequency components of the transformed data block. This results in a decreased cost per channel, or cost per box, when compared with known approaches.

Again, a system according to embodiments of the present invention gleans information from the transform data already stored in the DCT coefficient matrix generated to facilitate compression encoding. Analysis is provided based on that transform data at a small processing cost, but provides a high return with respect to the compression achieved as a result of the content discrimination, and allows for a reduction in the processing required to encode a particular frame if noise data is removed. Embodiments of the present invention use a DC component in order to distinguish noise from information in a digital video signal. Preferred embodiments additionally employ other frequency components to better distinguish noise from information in a digital video signal.

As such, the present invention can provide an apparatus for compressing video data. The apparatus includes a transform processor, such as a discrete cosine transform processor, to apply a transform, such as an orthogonal transform, to a digital video sequence to generate a coefficient matrix. The apparatus also includes a content discriminator to discriminate between regions of noise and content using the coefficient data for the candidate block and optionally data regarding neighbouring blocks.

The present invention can be implemented using any suitable combination of hardware and software including, but not limited to, a general-purpose computer, a digital signal processor (DSP), an application specific integrated circuit (ASIC), or a field programmable gate array (FPGA). The received video stream can be a native digital video stream or can be an analog video stream that has been digitized.

Application software embodying the content discrimination method can be provided on any suitable computer-useable medium for execution by the computer, such as CD-ROM, hard disk, read-only memory, or random access memory. In a presently preferred embodiment, the application software is written in a suitable programming language, such as C++, and is organized into steps and modules, as described above. The methods could be implemented in a digital signal processor (DSP) or other similar hardware-related implementation.

The present invention can be implemented in digital video recorders, digital video cameras and in other devices used to digitally encode video data. Currently, digital video camera manufacturers are dealing with a similar problem of video footage being shot in low light conditions taking up a larger space on a recording medium. In low light conditions, sensitivity of the sensor must be increased to detect the darkened image, which results in increased levels of noise. Therefore, some camera manufacturers are incorporating a day/night switch by way of which a user can select between a day setting and a night setting for digital video recording. In many instances, the night setting removes or eliminates colour components from the digital video signal being recorded. However, removal of the colour components only marginally increases the compressibility of the signal. An apparatus, device, or circuit according to embodiments of the present invention could be installed in digital video cameras in order to provide better compression in such instances.

While the present invention has been discussed above with reference to reducing storage space on a disk, it is equally applicable to reducing the size of transmission frames. It is contemplated that content discrimination according to the present invention can also be used for object discrimination, as well as object tracking (i.e. tracking a person, vehicle, etc.). The present invention can provide a considerable reduction in bit rate without affecting the subjective quality of the video. This can allow the use of low complexity algorithms that do not require persistent state memory.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of discriminating noise from content when compressing digital video data, comprising:
   computing a motion compensated difference frame from current image data and a reference frame;
   applying an orthogonal transform to the motion compensated difference frame in a pixel domain to obtain a transformed motion compensated difference frame having transform coefficients in a frequency domain, the transform coefficients including a DC component and AC components of a candidate block, the DC component having no frequency content and the AC components having frequency content;

selecting a region of the transformed motion compensated difference frame, the selected region including a candidate block and a plurality of neighboring blocks;

comparing, in the frequency domain, at least one component of the transform coefficients of the candidate block within the selected region of the transformed motion compensated difference frame to a threshold value to discriminate between content and noise;

determining whether any of the plurality of neighboring blocks surrounding the candidate block have content or noise; and encoding the candidate block only if content is detected in the candidate block or in any of the plurality of neighboring blocks.

2. The method of claim 1, wherein the threshold value is a predetermined static threshold value.

3. The method of claim 1, wherein comparing the at least one component of the candidate block to the threshold value comprises comparing the DC component of the candidate block to the threshold value.

4. The method of claim 3, wherein applying the orthogonal transform comprises applying a discrete cosine transform (DCT) to the motion compensated difference frame to obtain the DC component and AC components of the candidate block.

5. The method of claim 4, wherein comparing the at least one component of the candidate block to the threshold value further comprises comparing at least one AC component of the candidate block to a second threshold value.

6. The method of claim 5, wherein comparing the at least one AC component of the candidate block to the second threshold value comprises comparing an energy component of an AC region to the second threshold value.

7. The method of claim 1 wherein encoding the candidate block includes encoding to H.263, H.264, or MPEG standards.

8. A content discriminator for a digital video encoder, comprising:

a comparator to compare, in a frequency domain, at least one component of transform coefficients of a candidate block within a selected region of a transformed difference frame to a predetermined threshold value, the selected region including the candidate block and a plurality of neighboring blocks; and a content detector to discriminate between content and noise based on a result output by the comparator, wherein the comparator operates to compare at least one component of transform coefficients of the plurality of neighbouring blocks within the difference frame to the predetermined threshold value, and the content detector operates to discriminate between content and noise in the neighbouring blocks.

9. The content discriminator of claim 8, wherein the predetermined threshold value is a static threshold value.

10. The content discriminator of claim 8, wherein the at least one component is a DC component of the candidate block.

11. The content discriminator of claim 10, wherein the DC component is a coefficient of a discrete cosine transform (DCT).

12. The content discriminator of claim 8, wherein the at least one component is at least one AC component of the candidate block.

13. An video data compressor, comprising:

a transform processor to apply an orthogonal transform to a difference frame of a digital video sequence in a pixel domain to obtain a transformed difference frame having transform coefficients in a frequency domain;

a content discriminator to discriminate between noise and content within a selected region of the transformed difference frame, the selected region including a candidate block and a plurality of neighboring blocks, by comparing, in the frequency domain, at least one component of transform coefficients of the candidate block to a predetermined threshold value, and to determine whether any of the plurality of neighboring blocks have content or noise; and an encoder to encode the candidate block only if the content discriminator determines content is present in the candidate block or in any of the plurality of neighboring blocks.

14. The video data compressor of claim 13, wherein the threshold value is a predetermined static threshold value.

15. The video data compressor of claim 13, wherein the at least one component is a DC component.

16. The video data compressor of claim 15, the orthogonal transform is a DCT transform.

17. The video data compressor of claim 16, wherein the at least one component is at least one AC component.

18. The method of claim 6 wherein the energy component of the AC region comprises a sum of squared coefficients of the candidate block.

19. The method of claim 18 wherein the energy component of the AC region comprises a sum of squared values of a subset of AC components of the candidate block.

20. The method of claim 1 wherein the neighbouring blocks comprise eight neighbouring blocks surrounding the candidate block.

* * * * *